United States Patent [19]

Johnson

[11] Patent Number: 4,750,879
[45] Date of Patent: Jun. 14, 1988

[54] BEARING ARRANGEMENT

[75] Inventor: Lars Johnson, Kullavik, Sweden
[73] Assignee: Lars Johnson, Kullavik, Sweden
[21] Appl. No.: 908,018
[22] PCT Filed: Jan. 10, 1986
[86] PCT No.: PCT/SE86/00007
 § 371 Date: Sep. 9, 1986
 § 102(e) Date: Sep. 9, 1986
[87] PCT Pub. No.: WO86/04123
 PCT Pub. Date: Jul. 17, 1986

[30] Foreign Application Priority Data

Jan. 10, 1985 [SE] Sweden ................... 8500103

[51] Int. Cl.⁴ .................. F16C 19/10; B63H 9/08
[52] U.S. Cl. .................. 384/609; 114/106; 384/613
[58] Field of Search ............... 384/420, 424, 590, 608, 384/609, 612, 613, 617; 114/106, 107

[56] References Cited

U.S. PATENT DOCUMENTS

| | | | |
|---|---|---|---|
| 933,974 | 9/1909 | Gohlke | 384/608 |
| 1,176,889 | 3/1916 | Gohlke | 384/608 |
| 1,734,223 | 11/1929 | Melott | 384/613 |
| 1,914,204 | 6/1933 | Herold et al. | 384/609 |
| 3,650,583 | 3/1972 | Itin et al. | 384/613 |
| 4,248,281 | 2/1981 | Hood | 114/106 |

FOREIGN PATENT DOCUMENTS 1708557  2/1968  Fed. Rep. of Germany .

Primary Examiner—Stuart S. Levy
Assistant Examiner—Thomas R. Hannon
Attorney, Agent, or Firm—Balogh, Osann, Kramer, Dvorak, Genova & Traub

[57] ABSTRACT

A bearing which is to be acted upon by an axial load applied at a point radially displaced outside the bearing and which provides even load distribution. A number of bearing supports are distributed around the circumference of the bearing and are so arranged that the load is transferred to the bearing at a point displaced radially inwards toward the center of the bearing.

20 Claims, 4 Drawing Sheets

BEARING ARRANGEMENT

The present invention relates to a bearing which is so arranged as to be acted upon by an axial load applied at a point radially displaced outside the bearing for the purpose of transferring the active load at a point radially displaced inwards towards the centre of the bearing, and which comprises a number of bearing supports distributed around the circumference of the bearing.

In bearings which are so arranged as to be acted upon by a force applied at a point laterally displaced in relation to the centre of the bearing and which are so arranged as to operate with play in the bearing, an unfavourable distribution of the load on one edge of the bearing or on one roller body will usually occur, depending on the type of bearing concerned. For example, in the case of a bearing consisting of two axial ball bearings which are acted upon by an axial force applied at a point outside the rows of balls, unfavourable loading of the balls will occur if the play in the bearing decreases. If there is a great deal of play, what will happen is that only a single ball, which normally accepts the greatest load, will be loaded in each bearing, for which it was previously possible to compensate by pre-loading the bearing.

The bearing disclosed in German Pat. No. 1 708 557 comprises a moving upper part and a fixed lower part with a ring attached to each of the components, between which balls contained in the bearing are arranged to run. By cutting a recess in the ring which is capable of being acted upon by a load, it is possible for the upper part to be deflected and accommodated with a part of the recess, from its boundary edge. The possibility is afforded in this way in the aforementioned previously disclosed bearing of displacing the load inwards towards the centre of the bearing. A high degree of manufacturing accuracy is called for, however, in this previously disclosed arrangement, in addition to which the bearing rings must exhibit elasticity in order to be able to function in the intended manner.

The principal object of the present invention is essentially to propose a bearing of the kind described above which will overcome the problems of achieving the best possible load distribution. This is achieved without the need for bearing play, by distributing the load acting upon the bearing in the most advantageous fashion, thereby producing a considerable increase in the strength of the bearing, but without as a consequence having to increase the dimensions of the bearing to a corresponding degree. The arrangement may, for example, be applied to a bearing intended for a so-called swivel which is used on board a boat on a foresail so arranged as to run along a foremast.

This object is achieved by means of an arrangement in accordance with the present invention, which is characterized essentially in that a bearing body capable of being acted upon by a force is accommodated between two bearing rings or other appropriate bearing components contained in the bearing and each having its own bearings. In such case, a number of axially extending supporting bodies are capable of being accommodated between said bearing body and each bearing ring. The bodies are so distributed that two supporting bodies or the free ends of a common supporting body are situated between the centre of the bearing and the outside of the bearing to either side of the centre of the bearing viewed in a direction from one bearing ring to the other bearing ring.

The bearing in accordance with the present invention differs significantly from the previously disclosed arrangement referred to above. In accordance with the invention the bearing arrangement comprises a bearing body capable of being acted upon by a force and situated between two bearing rings or other appropriate bearing components contained in the bearing and each having its own bearings. A number of axially extending supporting bodies are also capable of being accommodated between the bearing body and each bearing ring. These supporting bodies are so distributed that two supporting bodies or the free ends of a common supporting body are situated between the centre of the bearing and the outside of the bearing to either side of the centre of the bearing viewed in a direction from one bearing ring to the other bearing ring. These bearing rings and the bearing body do not call for a high degree of manufacturing accuracy and do not require to be elastic, although bearing play is permissible in the bearing without the risk of its function being impaired significantly in the event of dirt or salt water finding its way inside. The component parts are also rigid, which permits the simple manufacture of the bearing arrangement, but which also means that its function will be entirely as specified in spite of what is stated above.

The invention is described below as a preferred illustrative embodiment, in conjunction with which reference is made to the drawings, in which.

Figure 1:
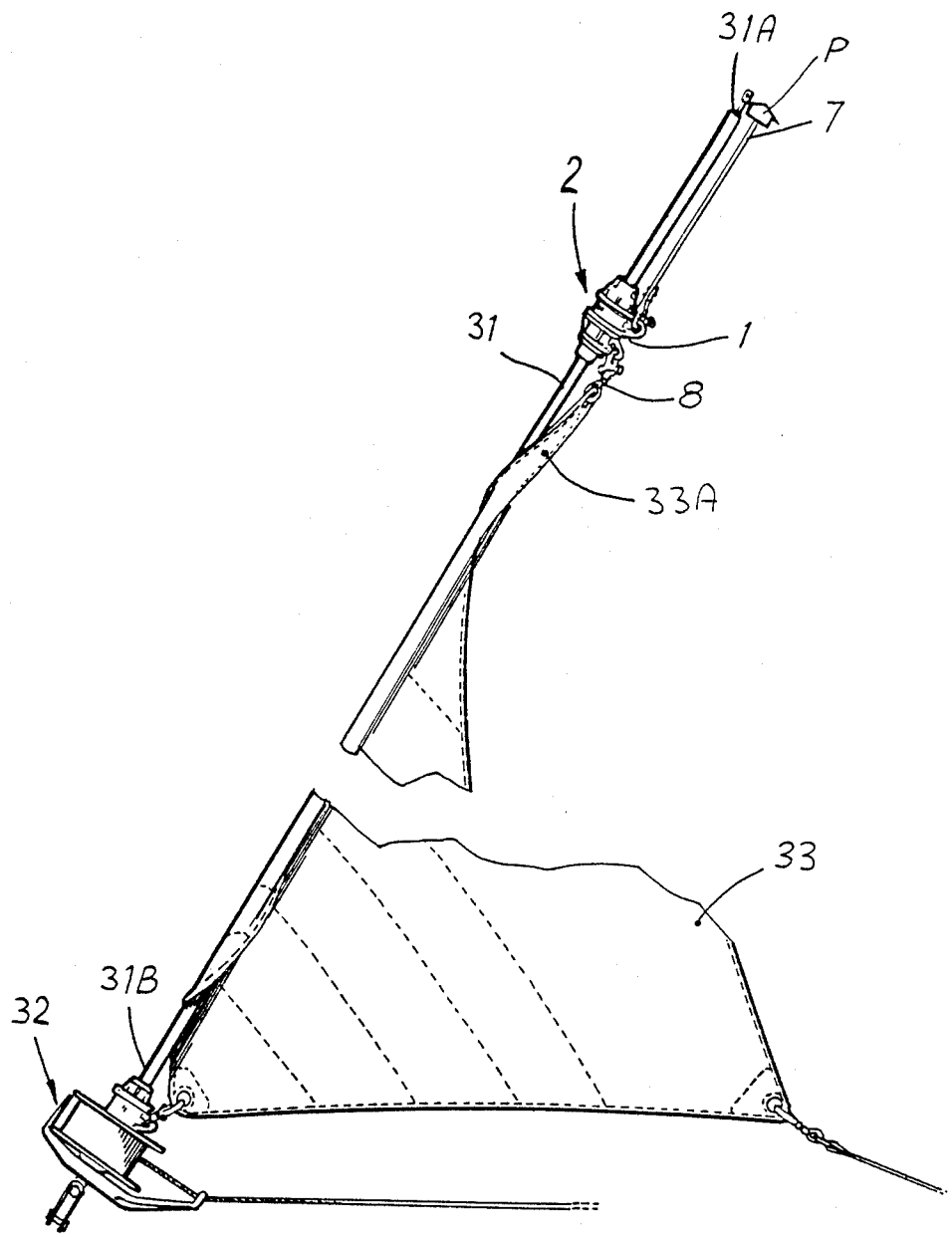
FIG. 1 shows a schematic view of a roller foresail to which an arrangement executed in accordance with the invention has been applied.
Figure 2:
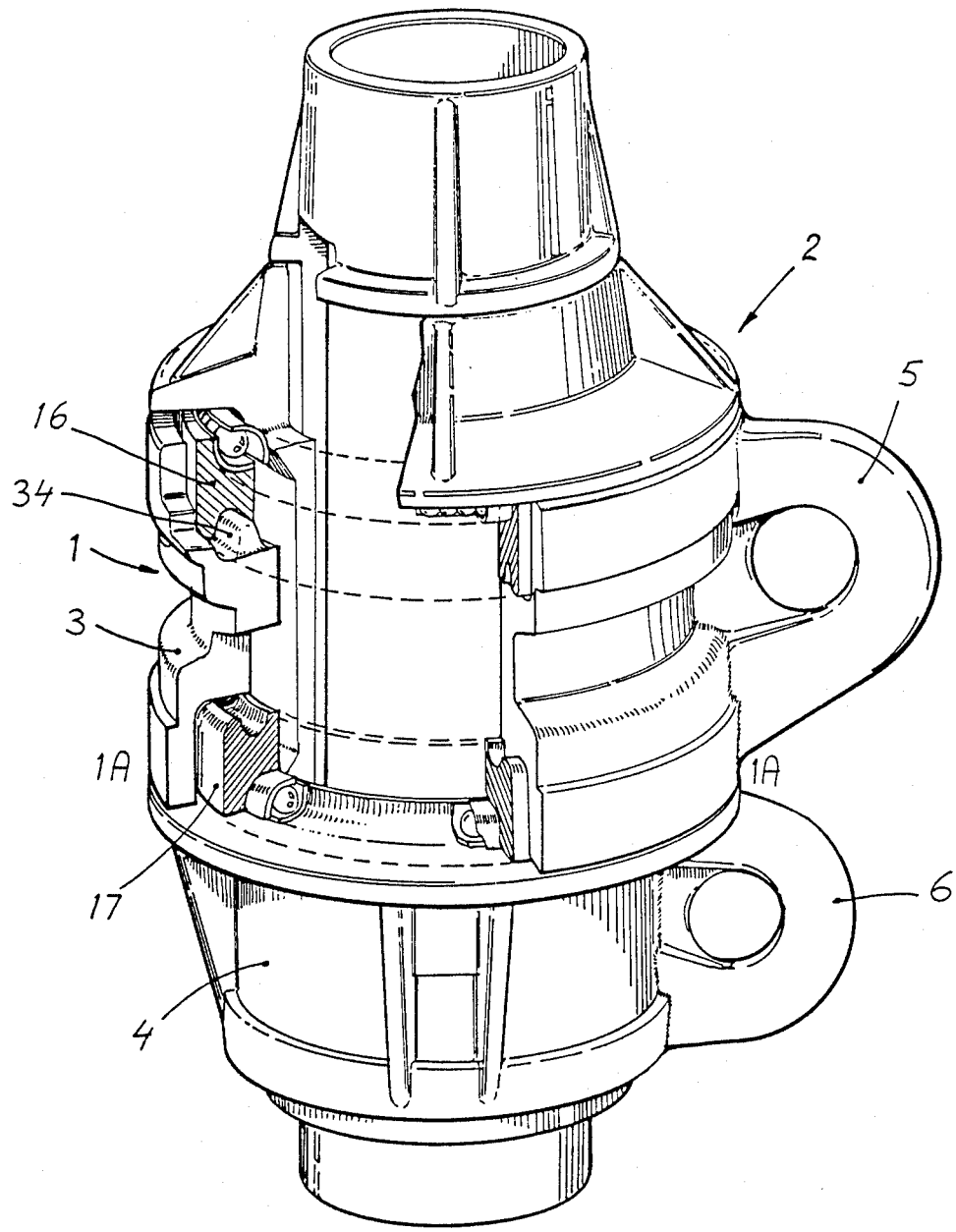
FIG. 2 shows a perspective view of a bearing executed in accordance with the invention, one section of which is illustrated in cut-away form.

The invention is applicable to a large number of different bearings in which load instances can arise with moments which act outside a bearing in question, although the invention is described in the following with reference to the drawings, which illustrate a bearing for a so-called lowering swivel, although for the sake of simplicity only in conjunction with a swivel bearing.

A bearing 1 for a swivel 2, which is illustrated in the drawings, is so arranged as to be capable of being acted upon by an axial active force P which is applied at a point radially displaced outside the bearing. The bearing comprises two sleeve-shaped bearing bodies 3 and 4 capable of being rotated in relation to one another and which are provided with eyes 5 and 6 or other appropriate attachment components to which, for instance, a hoisting cable 7 or a sail attachment device 8 on board a floating vessel can be attached in such a way as to be capable of being released.

The two bearing bodies 3, 4 are preferably so arranged as to be accommodated by and connected to a bearing tube 9 acting as a central sleeve, the tube being capable of being connected to a number of intermediate connecting elements 10 at each of the ends 9A, 9B of the hollow inner space 11 of the sleeve.

A flange 12 on the bearing tube 9 is so arranged as to constitute with a section 13 a bearing surface for a first bearing 14, such as a ball bearing, a roller bearing or a sliding bearing, acting between the first bearing body 3 and the bearing tube 9. A second bearing 15 is so arranged as to act between the two bearing bodies 3, 4.

An intermediate bearing ring 16 is so arranged as to act between the first bearing and an annular component 45 and a second bearing 15, which is in contact with a tube flange section 19 which is arranged on a flange 20 on the other bearing body 4. Inner and outer ball bearing rings 21, 22 and 23, 24 are so arranged as to act between ball bearings 25 and 26. The respective intermediate rings 16, 17 exhibit for this purpose an accommodating section 16A, 17A which fits an associated ball bearing ring 23, 24.

The installation of the swivel 2 is made possible after said intermediate connecting element 10 has been accommodated in the inner space 11 of the bearing tube 9 and has been screwed securely to the tube 9, by sliding the bearing bodies 3, 4 with their associated bearing components 21, 25, 23, 16 and 17, 24, 26, 22 onto the rod-shaped part 27 of the tube 9 and by rotating the bearing body 4 in relation to said tube 9. In this way an attachment device 28 on the tube 9 will interact with a matching attachment element 29 on the bearing body 4, whereupon the tube 9 and said bearing body 4 are locked together by means of, for example, a screw, to prevent rotating movement in relation to one another. An annular thicker section 30 of the tube 9 is so arranged as to interact with and to form a stop for said bearing body 4.

The intermediate connecting element 10, which may be manufactured from a so-called composite material, exhibits internally a recess which provides positive engagement with the peripheral form of a roller foresail arm 31. The element 10 may be attached in some other appropriate manner in order to prevent rotation of the swivel 2 in relation to said roller foresail arm 31. The roller foresail arm 31 is attached in a previously disclosed fashion at its end 31A, 31B to the top of a mast or to a rotating device 32 so as to permit a sail 33 to be rolled or unrolled onto or off the arm 31, at the same time as the upper end 33A of the sail, by its connection to the swivel 2 and after having been hoisted to the desired level, is held fast by means of the line 7.

Figure 3:
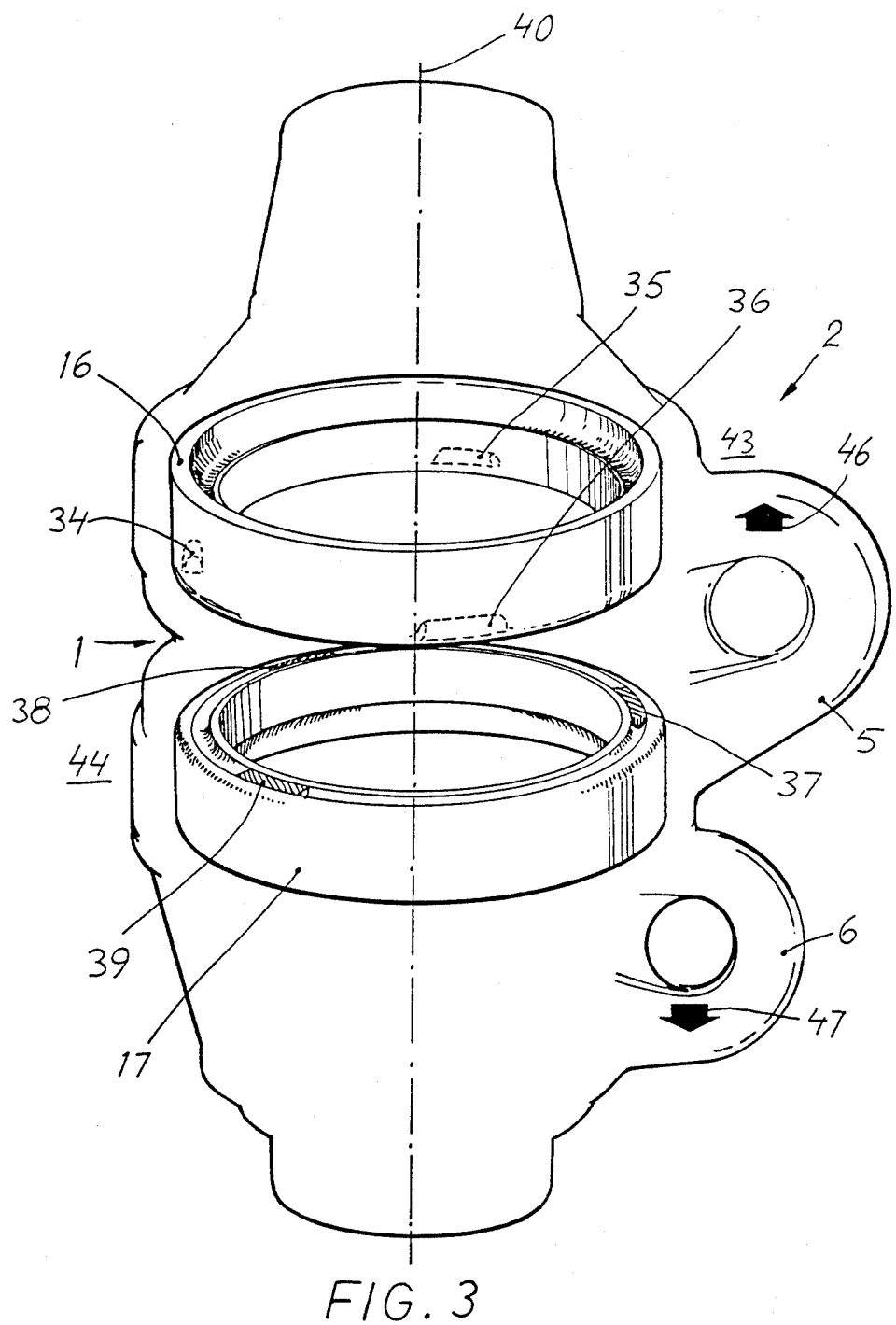
FIG. 3 shows a schematic diagram of the basic outline of the bearing in accordance with the invention.
Figure 4:
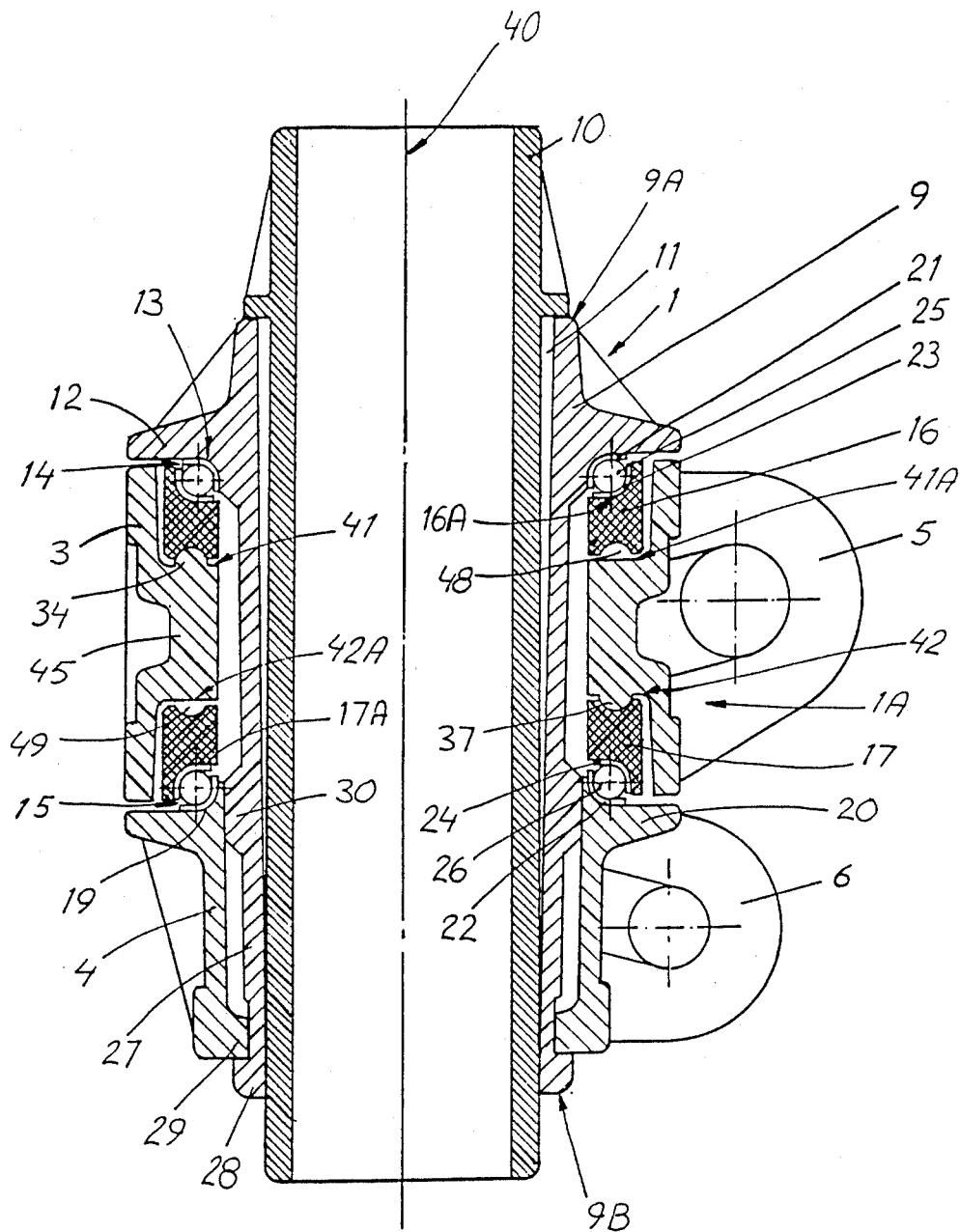
FIG. 4 shows a longitudinal section along the bearing.

In accordance with the invention the aim is to provide the bearing 1 with the maximum load distribution. A number of bearing supports 34–36 and 37–39 are provided for this purpose which are capable of acting between component parts of the bearing 1 and are distributed around the circumference of the bearing. The load, which acts upon the bearing 1, is displaced laterally in relation to the central axis 40 of the bearing and is transferred to the bearing 1 radially displaced inwards towards the centre 40 of the bearing. The bearing supports 34–39 in question are preferably in the form of supporting bodies which extend axially along the central axis 40 of the bearing. In FIG. 3, the three supporting bodies 34–36 and 37–39 are so arranged as to act on the respective bearing, 14 and 15. The supporting bodies 34–36 and 37–39 are distributed at a certain distance from one another and are so arranged as to act around the circumference of a supporting surface 41 and 42 on the first bearing body 3 so as to interact with matching bearing rings 16 and 17. The supporting bodies 34–39 may be integrated with the supporting surface 41, 42 in question, which may be essentially apart from said supporting bodies 34–39.

Two supporting bodies 35, 36 and 38, 39 can be positioned between the centre 40 of the bearing and the outer part 1A of the bearing on two supporting surfaces 41, 42 of the annular bearing body component 45. The body component 45 is contained in the bearing 1, and the two supporting surfaces 41, 42 face away from one another and are situated at a certain distance from one another along the bearing 1. The supporting bodies 35, 36 and 38, 39 which are arranged in pairs are so arranged in this way as to act upon one side 43 and 44 of the bearing. A force is applied to each part 41A, 42A of the supporting surface 41, 42, and in this way gives rise to a moment which counteracts that of the force applied to the attachment eye 5 outside the bearing 1, the direction of which is indicated by the arrow 46.

The supporting bodies 34–39 are preferably so arranged as to be accommodated in a matching annular groove 48 and 49 in the respective rings 16 and 17. If the bearing 1 is subjected to radial loading, then there will be advantages to be gained from arranging the grooves 48, 49 so as to exhibit an essentially 'U'-shaped cross-sectional profile, in order to prevent unfavorable bearing conditions from arising. The supporting bodies 34–39 can also be displaced in a radial direction towards the inside of said supporting surface 41, 42.

A further conceivable bearing alternative, although not illustrated in the drawings, involves the arrangement of a single supporting body in each bearing supporting surface 41, 42. The form of the supporting bodies in this case is preferably a part of a circle greater than 180°. The supporting bodies are turned so as to overlap one another, viewed in the longitudinal direction of the bearing along its central axis, so that the free ends of each supporting body are situated between the centre 40 of the bearing. The bearing side 43 or 44, for example, in the area of the supporting bodies 35, 36 and 38, 39, is illustrated in the drawing in FIG. 3.

The function of the proposed arrangement should be apparent from what is stated above, namely that when the bearing 1 is subjected to an axial force acting outside the row of balls, the load on the ball bearings 25, 26 will, unlike in the case of previously disclosed similar bearings, be displaced in a direction towards the centre 40 of the bearing. Instead of the load acting in an unfavourable fashion on a single ball at the circumference of the row of balls, the load will be supported by the majority of the balls situated within the periphery of the row of balls.

Calculations have demonstrated that, in the case of a bearing 1 consisting of two 30-ball axial ball bearings 14, 15 and interacting rigid metal rings 16, 17, the maximum load on the balls is only about 1/10 of the maximum loading to which a ball in an equivalent bearing of a previously disclosed type without a play compensator is subjected.

The invention is not restricted to what is stated above and illustrated in the drawings, but may be modified within the contex of the Patent Claims without the risk of departing from the idea of invention. For example, the groove in the bearing rings 16, 17 may be executed with a cross-sectional form having at least one cylindrical lateral surface and a flat bottom for the purpose, among other things, of reducing the incidence of axial forces attributable to the fact that the rings 16, 17 are displaced in relation to one another. Similarly, it is not necessary to provide separate bearing rings, and the bearings may be so arranged as to act directly upon the bearing ring bodies 3, 4, 9 concerned or upon some other appropriate bearing component.

What is claimed is:

1. A bearing which comprises a number of components, whereby an active load applied at a point radially displaced from the center of the bearing is transferred to a point radially displaced inwards towards the center of the bearing, comprising a number of bearing supports distributed around the circumference of the bearing, a bearing body being located between two spaced flanges on a bearing tube, bearing rings being disposed between each flange and said bearing body, each bearing ring being provided with individual ball bearings between said bearing ring and said flange, said bearing body having a plurality of axially extending supporting bodies disposed between said bearing rings, said supporting bodies being arranged so that at least two supporting bodies are disposed between the center of the bearing and outside portion of the bearing to either side of the center of the bearing viewed in a direction from one bearing ring to the other bearing ring.

2. A bearing according to claim 1, characterized in that at least three supporting bodies, situated at a certain distance from one another and distributed around the circumference of a pair of supporting surfaces (41, 42), are capable of interacting with the bearing rings between said supporting surfaces and said ball bearings.

3. A bearing according to claim 2, characterized in that the supporting bodies are integrated with the supporting surfaces.

4. A bearing according to claim 3, characterized in that the bearing body contained in said bearing comprises two supporting surfaces directed away from each other and situated at a specific distance from one another around said bearing.

5. A bearing according to claim 3, wherein said bearing is a part of a swivel arranged on a boat, and characterized in that said bearing body is in the form of a sleeve which, on its circumference, exhibits an attachment eye capable of being connected to a hoisting arrangement.

6. A bearing according to claim 3, characterized in that said supporting surfaces are essentially apart from said supporting bodies.

7. A bearing according to claim 2, characterized in that the supporting surfaces are essentially apart from said supporting bodies.

8. A bearing according to claim 7, characterized in that said supporting bodies are displaced in a radial direction towards the inside of said bearing surface and exhibit cross-sectional forms which preferably match cross-sectional forms of grooves in the bearing rings.

9. A bearing according to claim 2, characterized in that the supporting bodies are displaced in a radial direction towards the inside of said bearing surface and exhibit a cross-sectional form which preferably matches the cross-sectional forms of grooves in the bearing rings.

10. A bearing according to claim 9, characterized in that said grooves exhibit a partial circular cross section.

11. A bearing according to claim 2, characterized in that the bearing body contained in said bearing comprises two supporting surfaces directed away from each other and situated at a specific distance from one another around said bearing.

12. A bearing according to claim 2, wherein said bearing is a part of a swivel arranged on a boat, and characterized in that said bearing body is in the form of a sleeve which, on its circumference, exhibits an attachment eye capable of being connected to a hoisting arrangement.

13. A bearing according to claim 1, characterized in that the bearing body exhibits two supporting surfaces facing away from one another and situated at a certain distance from one another around the bearing.

14. A bearing according to claim 13, wherein said bearing is a part of a swivel arranged on a boat, and characterized in that said bearing body is in the form of a sleeve which, on its circumference, exhibits an attachment eye capable of being connected to a hoisting arrangement.

15. A bearing according to claim 13, characterized in that said supporting surfaces are essentially apart from said supporting bodies.

16. A bearing according to claim 13, characterized in that two supporting bodies are so arranged as to act upon the outside portion, viewed in relation to the center of the bearing, of a portion of the supporting surface which is so situated and arranged as to act in the direction of application of the force on the bearing body, viewed in relation to the center of the bearing.

17. A bearing according to claim 16, wherein said bearing is a part of a swivel arranged on a boat, and characterized in that said bearing body is in the form of a sleeve which, on its circumference, exhibits an attachment eye capable of being connected to a hoisting arrangement.

18. A bearing according to claim 6, characterized in that said supporting surfaces are essentially apart from said supporting bodies.

19. A bearing according to claim 1, in which the bearing is part of a swivel arranged on a boat, characterized in that the bearing body is in the form of a sleeve which, on its circumference, exhibits an attachment eye capable of being connected to a hoisting arrangement.

20. A bearing according to claim 19, characterized in that said supporting surfaces are essentially apart from said supporting bodies.

* * * * *